US011487907B2

(12) United States Patent
Kapron et al.

(10) Patent No.: US 11,487,907 B2
(45) Date of Patent: Nov. 1, 2022

(54) MULTI-MODE INTERFACES HAVING SECURE ALTERNATE MODES

(71) Applicant: Hewlett-Packard Development Company, L.P., Spring, TX (US)

(72) Inventors: Neill Thomas Kapron, Ft Collins, CO (US); Christopher Ritchie Tabarez, Ft Collins, CO (US); Nicolas James Jurich, Ft Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 113 days.

(21) Appl. No.: 16/482,298

(22) PCT Filed: Aug. 4, 2017

(86) PCT No.: PCT/US2017/045528
§ 371 (c)(1),
(2) Date: Jul. 31, 2019

(87) PCT Pub. No.: WO2019/027471
PCT Pub. Date: Feb. 7, 2019

(65) Prior Publication Data
US 2021/0294923 A1   Sep. 23, 2021

(51) Int. Cl.
*G06F 21/74* (2013.01)
*G06F 21/44* (2013.01)
*G06F 21/82* (2013.01)

(52) U.S. Cl.
CPC .............. *G06F 21/74* (2013.01); *G06F 21/44* (2013.01); *G06F 21/82* (2013.01)

(58) Field of Classification Search
CPC ....... G06F 21/40–46; G06F 21/60–608; G06F 21/70–79; G06F 21/80–88; H04L 63/04–0492; H04L 63/08–0892
See application file for complete search history.

(56) References Cited

U.S. PATENT DOCUMENTS

| 5,784,566 | A  | * | 7/1998  | Viavant .................. G06F 21/31 709/229 |
| 6,772,331 | B1 | * | 8/2004  | Hind ..................... H04W 12/06 707/999.009 |
| 7,594,106 | B2 |   | 9/2009  | Smith et al. |
| 7,813,508 | B2 | * | 10/2010 | Adachi .................... H04L 9/14 380/270 |
| 7,966,437 | B1 |   | 6/2011  | Spoden |
| 8,402,264 | B2 | * | 3/2013  | Lucidarme ............. H04L 63/20 713/153 |
| 8,589,683 | B2 | * | 11/2013 | Berrange ................ H04L 63/08 713/168 |

(Continued)

OTHER PUBLICATIONS

USB Drive Security Helps Protect Your Home Networks < https://www.eset.com/us/home/USB-drive-security/ >.

*Primary Examiner* — Madhuri R Herzog
(74) *Attorney, Agent, or Firm* — Hanley Flight & Zimmerman LLC

(57) ABSTRACT

Multi-mode interfaces having secure alternate modes are disclosed. An example method includes exposing to a device, during a first alternate mode negotiation session, an availability of a first secure alternate mode on a host, authenticating the device to the host using the first secure alternate mode, and responsive to the device being authenticated, exposing to the device a second secure alternate mode.

16 Claims, 5 Drawing Sheets

(56) References Cited

U.S. PATENT DOCUMENTS

| | | |
|---|---|---|
| 8,726,365 B2 | 5/2014 | Lemke |
| 9,282,106 B2 | 3/2016 | Fahmy et al. |
| 9,307,058 B2 * | 4/2016 | Xiong .................... H04L 69/24 |
| 2003/0044020 A1 | 3/2003 | Aboba et al. |
| 2004/0107344 A1 | 6/2004 | Minemura et al. |
| 2004/0162992 A1 | 8/2004 | Sami et al. |
| 2004/0210766 A1 * | 10/2004 | Kroselberg ........... H04L 63/164 |
| | | 726/26 |
| 2006/0269053 A1 * | 11/2006 | Miyazawa ............. H04L 9/0844 |
| | | 380/28 |
| 2011/0195665 A1 * | 8/2011 | Friedlaender .......... G08C 17/02 |
| | | 455/41.2 |
| 2014/0240776 A1 * | 8/2014 | Suzuki .................. G06F 3/1296 |
| | | 358/1.15 |
| 2015/0370299 A1 | 12/2015 | Waters |
| 2016/0378971 A1 | 12/2016 | Dunstan |
| 2017/0038810 A1 | 2/2017 | Ueki |

* cited by examiner

MULTI-MODE INTERFACES HAVING SECURE ALTERNATE MODES

BACKGROUND

Through alternate modes, universal serial bus (USB) Type-C interfaces support the dynamic (re-)configuration of a USB Type-C (a.k.a. USB-C) interface to support different combinations of interfaces (e.g., USB, power delivery, DISPLAYPORT®, high-definition multimedia interface (HDMI®), THUNDERBOLT®, mobile high-definition link (MHL®), peripheral component interconnect express (PCIe), etc.) over a USB-C cable. USB-C interfaces that support alternate modes include a switch to dynamically electrically couple components (e.g., a DISPLAYPORT interface) of a device (e.g., a host computer, a client device, etc.) with pins of the USB-C interfaces. USB-C interfaces implement a power-delivery (PD) protocol that allow two devices coupled via USB-C to exchange information regarding supported protocol(s), and the allocation of protocols to conductors of a USB-C cable.

Figure 1:
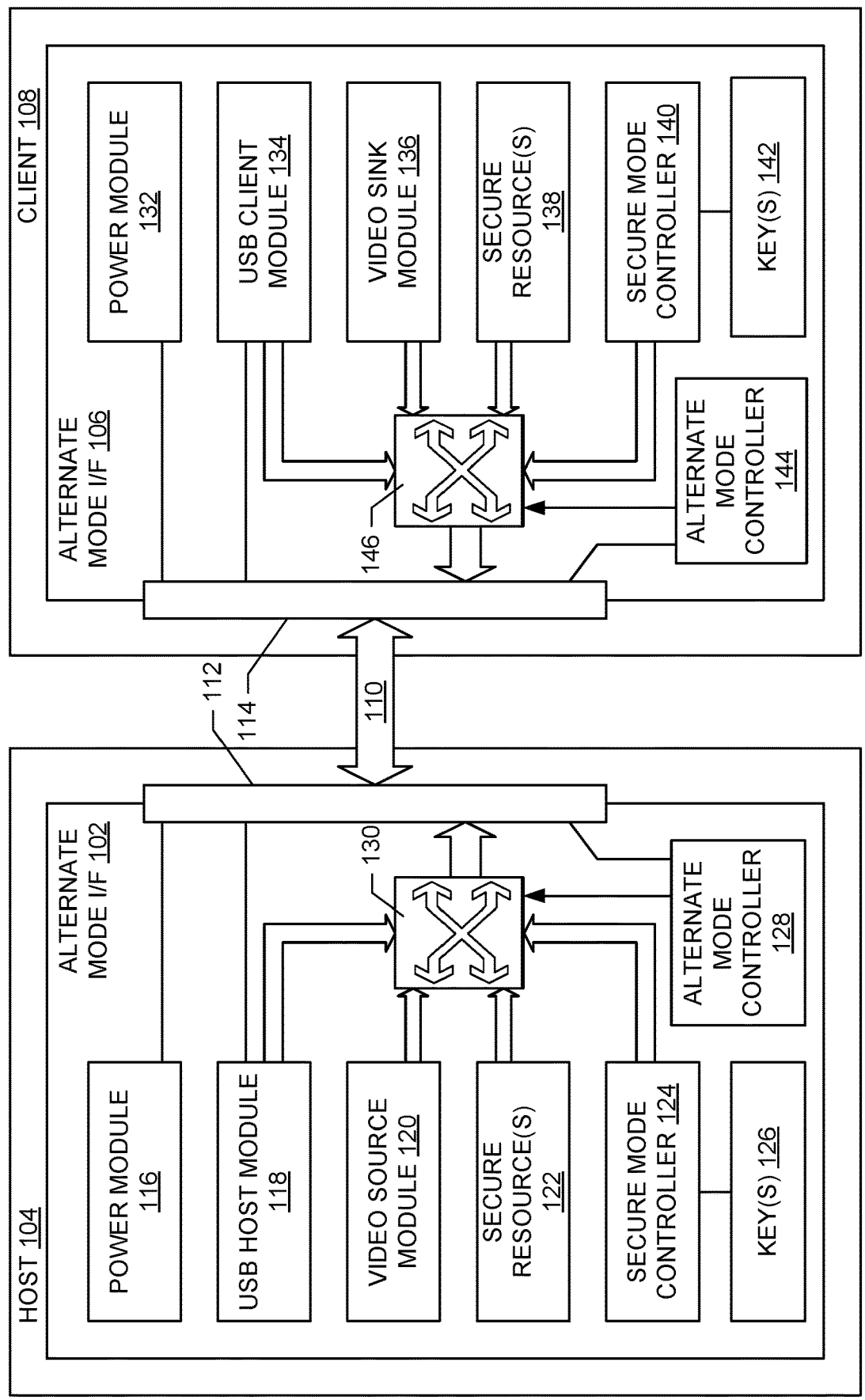
FIG. 1 illustrates an example environment in which an example host-side alternate mode interface and an example client-side alternate mode interface interact in accordance with this disclosure using secure modes.

Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Disclosed herein are multi-mode interfaces that implement secure (e.g., cryptographically secured, encrypted, authenticated, etc.) alternate modes. In some disclosed examples, a discovery & coordinating protocol implemented by an alternate mode controller of a host (e.g., a computer, a tablet, a game console, etc.) publishes (e.g., exposes, broadcasts, communicates, announces, advertises, lists, etc.) a secure alternate mode, if one is implemented, when an alternate mode handshake is initiated. Other secure alternate modes and/or non-secure alternate modes (e.g., USB, HDMI, DISPLAYPORT, etc.) that do not rely on secure communication are published in some examples. An example secure alternate mode includes an associated secure protocol (e.g., PCIe, non-volatile memory express (NVMe), serial AT attachment (SATA), high-bandwidth digital content protection (HDCP), etc.) over an interface (e.g., DISPLAYPORT, THUNDERBOLT, USB, HDMI, etc.). In some examples, the secure protocol can be used to, for example, securely communicate data (e.g., using encryption), securely obtain data (e.g., using encryption), access secured data (e.g., encrypted data stored on a storage device or disk), etc.

If the published secure alternate mode (e.g., an authentication mode) is supported by a connected client device (e.g., a USB flash drive, etc.), and authentication of the client device to the host device is successful using the authentication mode, the discovery & coordinating protocol announces alternative and/or additional secure alternate modes (e.g., access to an encrypted drive) that are now available. In response to successful authentication, alternative and/or additional secure alternate modes are published in an example second discovery & coordinating protocol session (e.g., an alternate mode negotiation session). In some examples, the second session (e.g., an alternate mode negotiation session) is a continuation of and/or part of the first session. In some examples, the second session is initiated by restarting the discovery & coordinating protocol session. In some examples, normally non-secure alternate modes (e.g., keyboard access, mouse access, video interface, printer interface, etc.) are announced after the authentication. In this way, even if the non-secure alternate modes are not secure, their use is restricted to only authenticated devices. For example, a person could be prevented from attaching and using a keyboard to gain illegitimate control of an unsupervised computer.

In some examples, a PD controller of a USB-C interface is modified to implement the disclosed example alternate mode controllers, and/or the disclosed example discovery & coordinating protocol. While references are made herein to USB, USB-C interfaces, USB-C cables, USB-C protocols, USB-C connectors, PD, etc. for the sake of explanation, the examples disclosed herein are not limited by such references. Instead, the teachings of this disclosure apply to any interface, protocol, cable, connectors, etc., or combination thereof that could implement alternate modes of operation (e.g., DISPLAYPORT, HDMI, THUNDERBOLT, FIREWIRE®). Instead, in some examples, an alternate mode interface (AMI) is any interface, protocol, cable, connectors, etc., or combination thereof that supports multiple modes of operation negotiable during a handshake, and a (re-)configurable electrical assignment of components that implement the negotiable modes of operation to conductors of a connector. Moreover, while some examples disclosed herein refer to electrical cables, conductors and connectors, the teachings of this disclosure are not limited to the electrical coupling of devices. For example, the teachings of this disclosure may be implemented for any wireless interfaces, protocols, signals, etc., such as ZIGBEE®, BLUETOOTH®, wireless local area network (WLAN) (a.k.a., wireless fidelity (Wi-Fi)), cellular, satellite, terrestrial radio, near field communication (NFC), etc.

Reference will now be made in detail to non-limiting examples of this disclosure, examples of which are illustrated in the accompanying drawings. The examples are described below by referring to the drawings.

FIG. 1 is a schematic illustration of an example environment 100 in which an example host-side AMI 102 of a host 104 (e.g., a computer, a tablet, a game console, etc.) interacts with a client-side AMI 106 of a client 108 (e.g., a smartphone, a tablet, a USB flash drive, a printer, a display, a keyboard, a mouse, a hub, a network interface, etc.). In the illustrated example of FIG. 1, the host-side AMI 102 is electrically coupled to the client-side AMI 108 with a cable 110 having electrical conductors, and respective connectors 112 and 114 (e.g., couplers, plugs, jacks, etc.). The example cable 110 and the connectors 112 and 114 may be implemented according to any type of interface including, but not limited to, a USB-C type interface.

To provide power to the example client 108, the example host-side AMI 102 of FIG. 1 includes an example power module 116. To provide a USB host interface (e.g., a USB 3.0 interface), the example host-side AMI 102 of FIG. 1 includes an example USB host module 118. To provide video to the client 108, the example host-side AMI 102 of FIG. 1 includes an example video source module 120, such as a DISPLAYPORT signal source.

In some examples, the example host-side AMI 102 of FIG. 1 includes example secure resources 122, such as, but not limited to, an encrypted storage device and/or an encrypted storage disk. In some examples, the secure resources 122 are accessed using a secure protocol associated with a secure alternate mode negotiated according to the teachings of this disclosure.

To provide secure alternate modes, the example host-side AMI 102 includes an example secure mode controller 124. In some examples, the example secure mode controller 124 of FIG. 1 is a microcontroller designed to provide (e.g., control, grant, etc.) secure access to (non-) secure alternate modes of the host-side AMI 102 using example cryptographic key(s) 126. The example secure mode controller 124 authenticates clients (e.g., the example client 108). In some examples, the secure mode controller 124 uses a public key infrastructure (PM) to authenticate the clients (e.g., the example client 108). In some examples, the secure mode controller 124 manages the configuring of keys and security policies. In some examples, the secure mode controller 124 is a trusted platform module (TPM).

To publish and negotiate alternate modes, the example host-side AMI 102 includes an example alternate mode controller 128. In some examples, the example alternate mode controller 128 obtains from the example secure mode controller 124 a list of available (e.g., supported, etc.) (non-) secure alternate modes supported by the host-side AMI 102. By obtaining the list from the secure mode controller 124, the example secure mode controller 124 can restrict (e.g., block, prevent, control, limit, etc.) access to certain (non-) secure alternate modes until a client (e.g., the example client 108) is authenticated. In some examples, a PD controller implements the alternate mode controller 128. In some examples, the alternate mode controller 128 is implemented by a PD controller that publishes the alternate modes identified by the secure mode controller 124. In some examples, the alternate mode controller 128 implements the example secure mode controller 124.

To connect the power module 116, the example USB host module 118, the example video source module 120, the secure resources 122, the example secure module controller 124 and/or the alternate mode controller 128 to the connector 112, the example host-side AMI 102 includes a switch 130 (e.g., a multiplexer, etc.). In the illustrated examples, the alternate mode controller 128 controls the example switch 130.

Turning to the client 108, to receive power from the example host 104, the example client-side AMI 106 of FIG. 1 includes an example power module 132. To provide a USB client interface (e.g., a USB 3.0 interface), the example client-side AMI 106 of FIG. 1 includes an example USB client module 134. To receive video, the example client-side AMI 106 of FIG. 1 includes an example video sink module 136, such as for a DISPLAYPORT signal.

In some examples, the example client-side AMI 106 includes example secure resources 138, such as, but not limited to, an encrypted storage device and/or an encrypted storage disk. In some examples, the secure resources 138 are accessed using a secure protocol associated with a secure alternate mode negotiated according to the teachings of this disclosure.

To provide secure alternate modes, the example client-side AMI 106 includes an example secure mode controller 140. In some examples, the example secure mode controller 140 of FIG. 1 is a microcontroller designed to provide (e.g., control, grant, etc.) secure access to (non-) secure alternate modes of the client-side AMI 106 using example cryptographic key(s) 142. The example secure mode controller 140 authenticates hosts (e.g., the example host 104). In some examples, the secure mode controller 140 uses PM to authenticate hosts (e.g., the example host 104). In some examples, the secure mode controller 140 manages the configuring of keys and security policies. In some examples, the secure mode controller 140 is a TPM.

To publish and negotiate alternate modes, the example client-side AMI 106 includes an example alternate mode controller 144. In some examples, the example alternate mode controller 144 obtains from the example secure mode controller 140 a list of alternate modes supported by the client-side AMI 106. By obtaining the list from the secure mode controller 140, the example secure mode controller 140 can restrict (e.g., block, prevent, control, limit, etc.) access to certain (non-) secure alternate modes until a host (e.g., the example host 104) is authenticated. In some examples, the alternate mode controller 144 is implemented by a PD controller that publishes the alternate modes identified by the secure mode controller 140. In some examples, the alternate mode controller 144 implements the example secure mode controller 140.

To connect the power module 132, the example USB client module 134, the example video sink module 136, the secure resources 138, the example secure module controller 140 and/or the alternate mode controller 144 to the connector 114, the example host-side AMI 102 includes any switch (e.g., a multiplexer, etc.) 146. In the illustrated examples, the alternate mode controller 144 controls the example switch 146.

While an example manner of implementing the example host-side AMI 102 is illustrated in FIG. 1, elements, processes and/or devices illustrated in FIG. 1 may be combined, divided, re-arranged, omitted, eliminated and/or implemented in any other way. Further, the example connector 112, the example power module 116, the example USB host module 118, the example video source module 120, the example secure resource(s) 122, the example secure module controller 124, the example key(s) 126, the example alternate mode controller 128, the example switch 130 and/or, more generally, the example host-side AMI 102 of FIG. 1 may be implemented by hardware, software, firmware and/or any combination of hardware, software and/or firmware. Thus, for example, any of the example connector 112, the example power module 116, the example USB host module 118, the example video source module 120, the example secure resource(s) 122, the example secure module controller 124, the example key(s) 126, the example alternate mode controller 128, the example switch 130 and/or, more generally, the example host-side AMI 102 of FIG. 1 could be implemented by analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example connector 112, the example power module 116, the example USB host module 118, the example video source module 120, the example secure resource(s) 122, the example secure module controller 124, the example key(s) 126, the example alternate mode controller 128, the example switch 130 and/or, more generally, the example host-side AMI 102 is/are hereby expressly defined to include a non-transitory computer readable storage device or storage disk such as a memory, a digital versatile disk (DVD), a compact disc (CD), a Blu-ray disk, etc. including the software and/or firmware. Further still, the example host-side AMI 102 may include elements, processes and/or devices in addition to, or instead of, those illustrated in FIG. 1, and/or may include more of the illustrated elements, processes and devices.

While an example manner of implementing the example client-side AMI 106 is illustrated in FIG. 1, elements, processes and/or devices illustrated in FIG. 1 may be combined, divided, re-arranged, omitted, eliminated and/or implemented in any other way. Further, the example connector 114, the example power module 132, the example USB host module 134, the example video source module 136, the example secure resource(s) 138, the example secure module controller 140, the example key(s) 142, the example alternate mode controller 144, the example switch 146 and/or, more generally, the example client-side AMI 106 of FIG. 1 may be implemented by hardware, software, firmware and/or any combination of hardware, software and/or firmware. Thus, for example, any of the example connector 114, the example power module 132, the example USB host module 134, the example video source module 136, the example secure resource(s) 138, the example secure module controller 140, the example key(s) 142, the example alternate mode controller 144, the example switch 146 and/or, more generally, the example client-side AMI 106 of FIG. 1 could be implemented by analog or digital circuit(s), logic circuits, programmable processor(s), programmable controller(s), GPU(s), DSP(s), ASIC(s), PLD(s), FPGA(s), FPLD(s), etc. When reading any of the apparatus or system claims of this patent to cover a purely software and/or firmware implementation, at least one of the example connector 114, the example power module 132, the example USB host module 134, the example video source module 136, the example secure resource(s) 138, the example secure module controller 140, the example key(s) 142, the example alternate mode controller 144, the example switch 146 and/or, more generally, the example client-side AMI 106 is/are hereby expressly defined to include a non-transitory computer readable storage device or storage disk such as a memory, a DVD, a CD, a Blu-ray disk, etc. including the software and/or firmware. Further still, the example host-side AMI 102 may include elements, processes and/or devices in addition to, or instead of, those illustrated in FIG. 1, and/or may include more of the illustrated elements, processes and devices.

Figure 2:
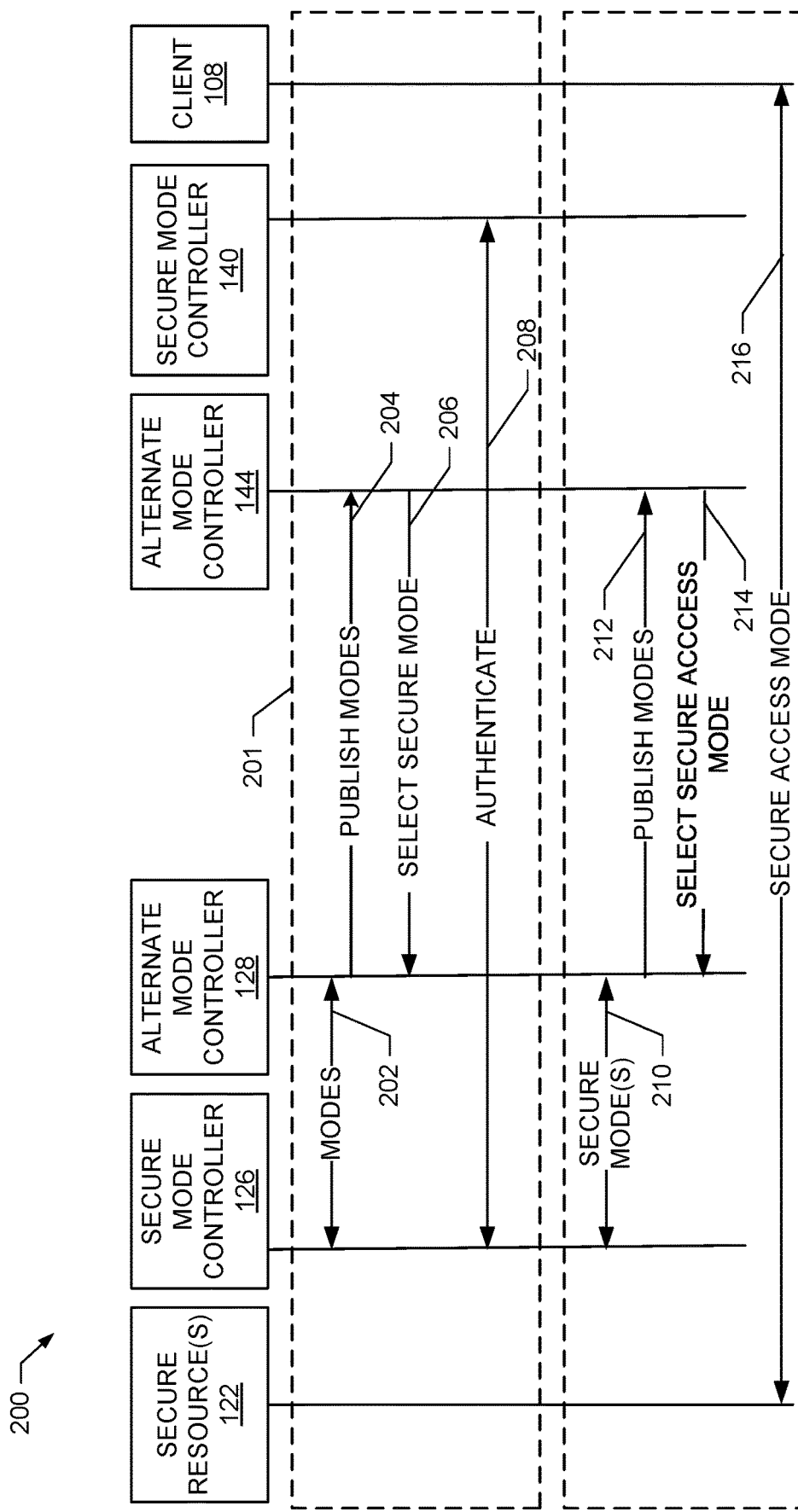
FIG. 2 illustrates an example interaction between the example host and the example client of FIG. 1 to interact using secure modes.

FIG. 2 illustrates an example interaction 200 between the example host 104 and the example client 108 of FIG. 1 to interact using secure alternate modes. Starting with a first alternate mode negotiation session 201, the example alternate mode controller 128 obtains a first list of available alternate modes from the secure mode controller 124 (line 202). In the illustrated example, the first list includes, possibly among other alternate modes, a first secure alternate mode in the form of a secure authentication mode. The alternate mode controller 128 publishes the list obtained from the secure mode controller 126 to the client 108 (line 204). In the illustrated example, the example alternate mode controller 144 selects a secure alternate mode from the list (line 206). The example secure mode controllers 126 and 140 authenticate the client 108 (line 208).

After successful authentication, the example interaction 200 begins a second alternate mode negotiation session 209 in which the example alternate mode controller 128 obtains a new second list of (non-) secure alternate modes from the example secure mode controller 126 (line 210). In some examples, the second list includes, possibly among other alternate modes, a second secure alternate mode in the form of secure access to an encrypted storage disk or device access. The alternate mode controller 128 publishes the new list obtained from the secure mode controller 126 (line 212). In the illustrated example, the alternative mode controller 144 selects a secure resource access mode (line 214), and the client 108 accesses the secure resource 122 via the protocol associated with the selected secure access mode (line 216).

While the illustrated examples of FIGS. 1 and 2 were described by referring to the AMI 102 as a host-side interface, and the AMI 106 as a client-side interface for clarity of explanation, AMI 102 and/or AMI 106 can implement a host-side interface and/or a client-side interface depending on how they are configured. For example, a laptop could implement a host-side interface and provide a secure alternate access to encrypted data stored on the laptop, and could, possibly at the same time, implement a client-side interface to use a secure alternate access mode to access encrypted data stored on a USB flash drive.

Figure 3:
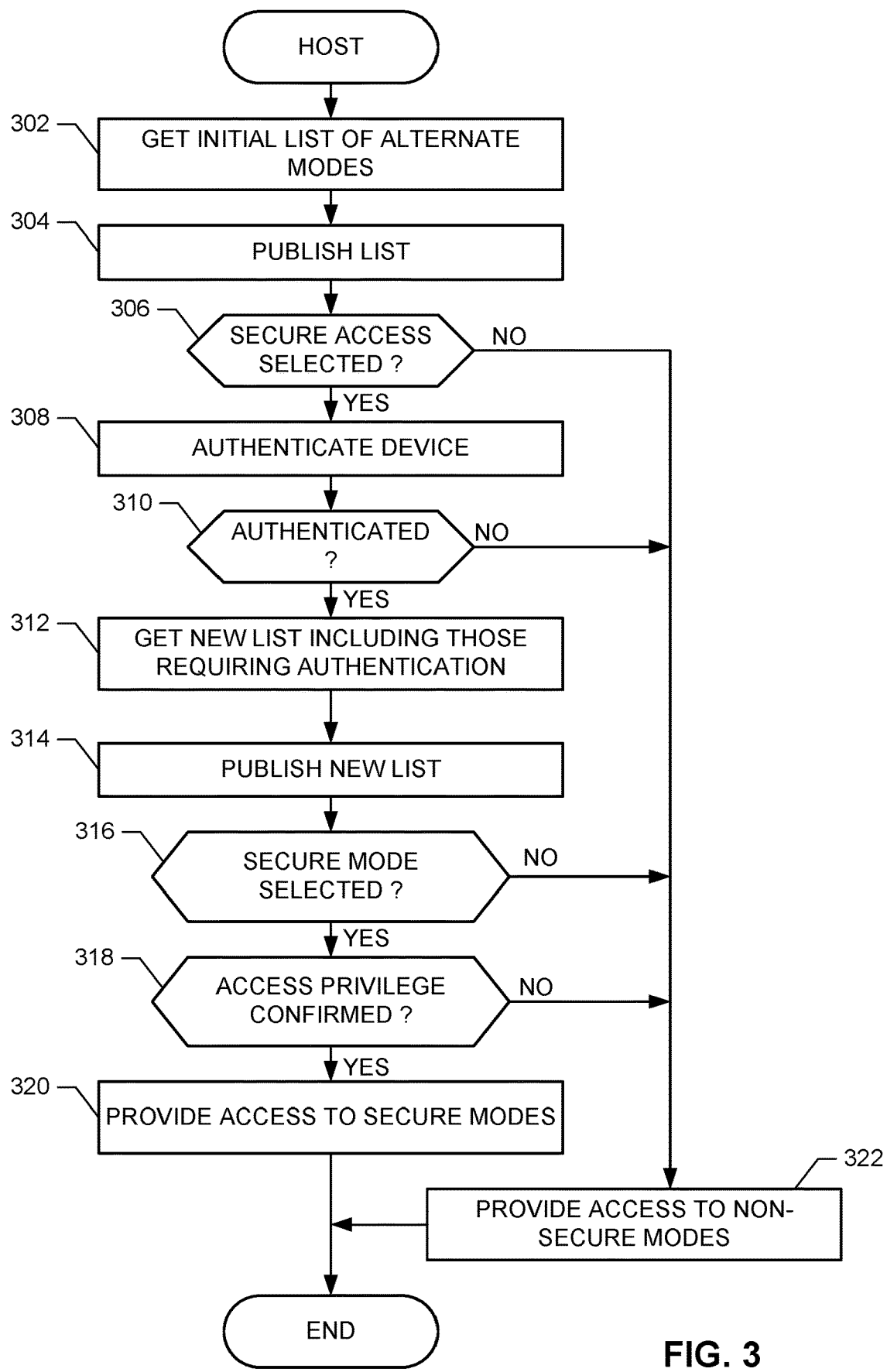
FIG. 3 is a flowchart representing example processes as computer-readable instructions that may be executed to implement the example host-side alternate mode interface of FIG. 1 and/or the example client-side alternate mode interface of FIG. 1 to provide access to secure modes.

An example flowchart representative of example machine-readable instructions for implementing the example AMIs 102 and 106 of FIG. 1 is shown in FIG. 3 to provide access to secure alternate modes. For clarity, the example flowchart of FIG. 3 will be described with reference to the example host-side AMI 102, however, the client-side AMI 106 can also execute the example instructions of FIG. 3. That is, the example host 104 and the example client 108 can both publish and/or provide alternate modes in a second negotiation session based on an authentication performed in a first negotiation session. In these examples, the machine-readable instructions comprise a program for execution by a processor such as the processor 510 shown in the example processor platform 500 discussed below in connection with FIG. 5. The program may be embodied in software stored on a non-transitory computer readable storage medium such as a CD, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example programs are described with reference to the flowcharts illustrated in FIG. 3, many other methods of implementing the example host-side AMI 102 and the example client-side AMI 106 may alternatively be used. For example, the order of execution of the blocks may be changed, and/or some of the blocks described may be changed, eliminated, or combined. Additionally, or alternatively, any of the blocks may be implemented by hardware circuits (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware.

As mentioned above, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program of FIG. 3 begins at block 302 with a first alternate mode negotiation session 201 (FIG. 2). In first alternate mode negotiation session 201, the example alternate mode controller 128 (FIG. 1) of a device (e.g., the example host 104) obtains a first list of available (non-) secure alternate modes from the example secure mode controller 124 (FIG. 1). The alternate mode controller 128 publishes the list of available (non-) secure alternate modes (block 304) to a communicatively coupled device (e.g., the example client 108) (block 304). In the illustrated example, the first list includes, possibly among other alternate modes, a first secure alternate mode in the form of a secure authentication mode. If the other device selects a secure alternate mode (block 306), the example secure mode controller 124 attempts to authenticate the other device (block 308).

If the other device is authenticated (block 310), the example alternate mode controller 128, in a second alternate mode negotiation session 209 (FIG. 2), obtains another list of available (non-) secure alternate modes from the example secure mode controller 124 that are available after authentication (block 312). The alternate mode controller 128 publishes the new second list of available (non-) secure alternate modes (block 314). In some examples, the second list includes, possibly among other alternate modes, a secure alternate mode in the form of secure access to an encrypted storage disk or device access. If the other device selects a secure alternate mode (block 316), the example secure mode controller 124 confirms the other device has been authenticated (block 318). In some examples, in the first alternate mode negotiation session 201, the secure mode controller 124 stores an authentication key in memory and confirms in the second alternate mode negotiation session 219 that it has not changed. If the authenticity of the other device is confirmed (block 318), the other device is provided access to secure alternate modes (block 320).

Returning to block 318, if the device is not confirmed as authentic (block 318), the other device is provided access to non-secure alternate modes that are available without authentication (block 322).

Returning to block 316, if a secure alternate mode is not selected (block 316), the other device is provided access to non-secure alternate modes that do not require authentication (block 322).

Returning to block 310, if the other device is not authenticated (block 310), control proceeds to block 322 to provide the other device with access to non-secure alternate modes that are available without authentication (block 322).

Returning to block 306, if a secure alternate mode is not selected (block 306), control proceeds to block 322 to provide the other device with access to non-secure alternate modes that are available without authentication (block 322).

Figure 4:
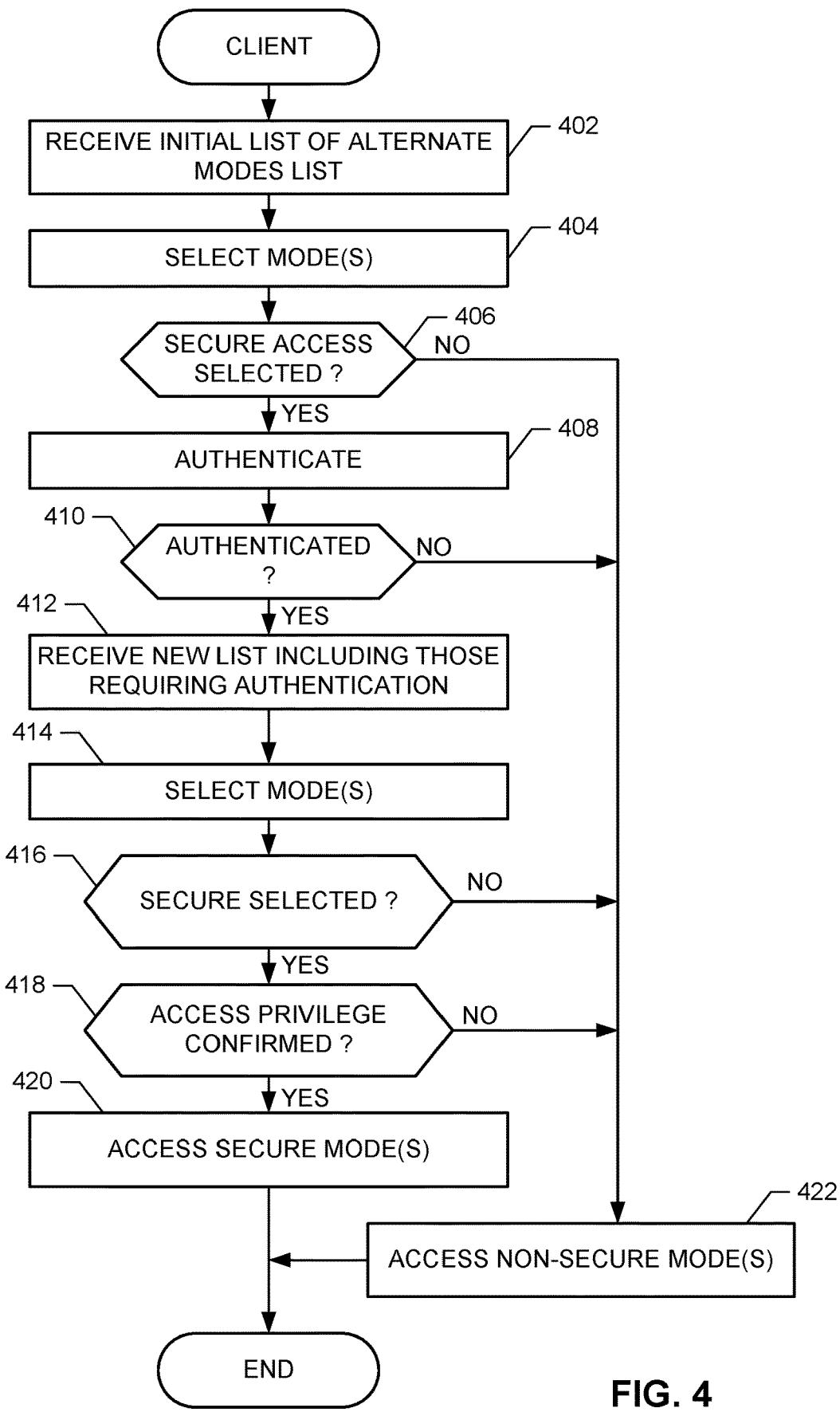
FIG. 4 is a flowchart representing example processes as computer-readable instructions that may be executed to implement the example host-side alternate mode interface of FIG. 1 and/or the example client-side alternate mode interface of FIG. 1 to access secure modes.

An example flowchart representative of example machine-readable instructions for implementing the example AMIs 102 and 106 of FIG. 1 is shown in FIG. 4 to access secure alternate modes published by another device. For clarity, the example flowchart of FIG. 4 will be described with reference to the example client-side AMI 106, however, the host-side AMI 102 can also execute the example instructions of FIG. 4 to access secure alternate modes published by another device. That is, the example host 104 and the example client 108 can both access published secure alternate modes in a second negotiation session based on an authentication performed in a first negotiation session. In these examples, the machine-readable instructions comprise a program for execution by a processor such as the processor 510 shown in the example processor platform 500 discussed below in connection with FIG. 5. The program may be embodied in software stored on a non-transitory computer readable storage medium such as a CD, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example programs are described with reference to the flowcharts illustrated in FIG. 4, many other methods of implementing the example host-side AMI 102 and the example client-side AMI 106 may alternatively be used. For example, the order of execution of the blocks may be changed, and/or some of the blocks described may be changed, eliminated, or combined. Additionally, or alternatively, any of the blocks may be implemented by hardware circuits (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware.

As mentioned above, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program of FIG. 4 begins at block 402 in a first alternate mode negotiation session 201 (FIG. 2) in which the example alternate mode controller 144 (FIG. 1) of a device (e.g., the example client 108) obtains a first list of available (non-) secure alternate modes from the host-side AMI 102 (FIG. 1). In some examples, the first list includes a first secure alternate mode in the form of a secure alternate authentication mode. The alternate mode controller 144 receives the list of available (non-) secure alternate modes (block 404) from a communicatively coupled device (e.g., the example host 104) (block 404). If a secure alternate mode is selected (block 406), the example secure mode controller 144 authenticates the host 104 (block 408).

If authentication is successful (block 410), the example alternate mode controller 144 in a second alternate mode negotiation session 209 (FIG. 2) receives another second list of available (non-) secure alternate modes from the example secure mode controller 124 that are available after authentication (block 412), and selects alternate modes (block 414). In some examples, the second list includes a second secure alternate mode in the form of secure access to an encrypted storage disk or device access. If a secure alternate mode is selected (block 416), the example secure mode controller 144 confirms the other device has been authenticated (block 418). In some examples, in the first alternate mode negotiation session 201, the secure mode controller 138 stores an authentication key in memory and confirms in the second alternate mode negotiation session 219 that it has not changed. If the authentication is confirmed (block 418), access to the selected secure alternate modes is obtained (block 420).

Returning to block 418, if the device is not confirmed as authentic (block 418), access to non-secure alternate modes that are available without authentication is obtained (block 422).

Returning to block 416, if a secure alternate mode is not selected (block 416), access to non-secure alternate modes that are available without authentication is obtained (block 422).

Returning to block 410, if authentication is not successful (block 410), control proceeds to block 422 to access to non-secure modes that are available without authentication is obtained (block 422).

Returning to block 406, if a secure alternate mode is not selected (block 406), control proceeds to block 422 to access to non-secure modes that are available without authentication is obtained (block 422).

Figure 5:
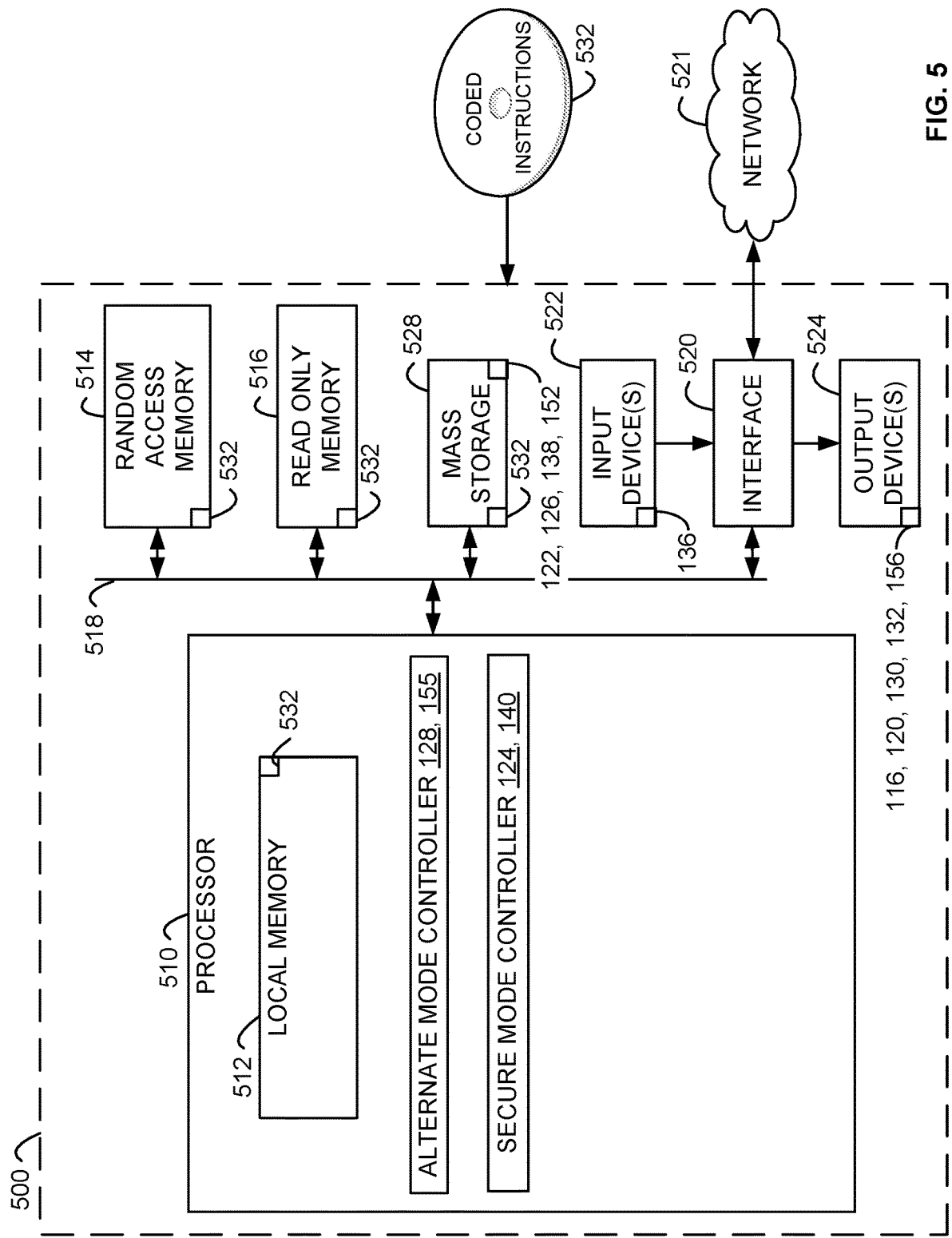
FIG. 5 illustrates an example processor platform structured to execute the example computer-readable instructions of FIGS. 3 and 4 to interact using secure modes.

FIG. 5 is a block diagram of an example processor platform 500 capable of executing the instructions of FIGS. 3 and 4 to implement the host-side AMI 102 and the example client-side AMI 106 of FIG. 1. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 510. The processor 510 of the illustrated example is hardware. For example, the processor 510 can be implemented by integrated circuits, logic circuits, microprocessors, GPUs, DSPs or controllers from any desired family or manufacturer. The hardware processor may be a semiconductor based (e.g., silicon based) device. In this example, the processor implements the example alternate mode controller 128 and 144, and the example secure mode controllers 124 and 140.

The processor 510 of the illustrated example includes a local memory 512 (e.g., a cache). The processor 510 of the illustrated example is in communication with a main memory including a volatile memory 514 and a non-volatile memory 516 via a bus 518. The volatile memory 514 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The example interface circuit 520 facilitates exchange of data with external machines (e.g., computing devices of any kind) via a network 521. The interface circuit 520 may be implemented by any type of communication interface standard, such as an Ethernet interface, a USB interface, a BLUETOOTH interface, an NFC interface, a ZIGBEE interface, WLAN interface, a cellular transceiver, a satellite transceiver, terrestrial radio interface, an HDMI interface, a THUNDERBOLT interface, a FIREWIRE interface, an MHL interface, and/or a PCIe interface. In this example, the interface circuit 520 implements the example USB modules 118 and 134.

In the illustrated example, input devices 522 are connected to the interface circuit 520. The input device(s) 522 permit(s) a user to enter data and/or commands into the processor 510. The input device(s) can be implemented by, for example, a USB device, a USB flash drive, video input ports, an audio sensor, a microphone, a camera (still or video), a keyboard, a button, a mouse, a touchscreen, a track-pad, a trackball, isopoint and/or a voice recognition system. In this example, an example input device 522 implements the example video sink module 136.

Output devices 524 are also connected to the interface circuit 520 of the illustrated example. The output devices 524 can be implemented, for example, by display devices, a tactile output device, a printer, and/or speakers. In this example, an example output device 524 implements the example video source module 120, and the example power modules 116 and 132, and the example switches 130 and 146.

The processor platform 500 of the illustrated example also includes mass storage devices 528 for storing software and/or data. Examples of such mass storage devices 528 include floppy disk drives, hard drive disks, solid-state drives, CD drives, Blu-ray disk drives, redundant array of independent disks (RAID) systems, and DVD drives.

Coded instructions 532 including the coded instructions of FIGS. 3 and 4 may be stored in the mass storage device 528, in the volatile memory 514, in the non-volatile memory 516, and/or on a removable tangible computer readable storage medium such as a CD or DVD. In this example, the mass storage device 528 implements the example secure resource(s) 122 and 138, and the key(s) 126 and 142.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B. In this specification and the appended claims, the singular forms "a," "an" and "the" do not exclude the plural reference unless the context clearly dictates otherwise.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    exposing to a device, during a first alternate mode negotiation session, an availability of a first secure alternate mode on a host;
    performing an authentication of the device to the host using the first secure alternate mode;
    in response to the device being authenticated, exposing to the authenticated device a second secure alternate mode and a first non-secure alternate mode, an availability of the first non-secure alternate mode based on the authentication of the device; and
    in response to a failure to authenticate the device, exposing the unauthenticated device to a second non-secure alternate mode, the second non-secure alternate mode different than the first non-secure alternate mode, an availability of the second non-secure alternate mode independent of the authentication of the device.

2. The method of claim 1, further including exposing the second secure alternate mode to the authenticated device without exposing the second secure alternate mode to the unauthenticated device.

3. The method of claim 1, wherein exposing the second secure alternate mode and the first non-secure alternate mode to the authenticated device includes exposing the second alternate secure mode and the first non-secure alternate mode to the device separately from the exposing of the device to the first secure alternate mode.

4. The method of claim 1, further including exposing the second secure alternate mode and the first non-secure alternate mode in a second alternate mode negotiation session after the device is authenticated.

5. The method of claim 4, wherein (a) the first alternate mode negotiation session includes the second alternate mode negotiation session, or (b) the second alternate mode negotiation session is initiated after a restart of the first alternate mode negotiation session.

6. The method of claim 1, further including:
    exposing the first secure alternate mode in a first list of supported alternate modes; and
    exposing the second secure alternate mode in a second list of supported alternate modes, wherein the second secure alternate mode is not included in the first list of supported alternate modes.

7. The method of claim 1, further including establishing the second secure alternate mode with the authenticated device.

8. The method of claim 7, wherein the second secure alternate mode includes an encrypted storage access.

9. The method of claim 1, further including:
    receiving a list of available secure alternate modes from a secure mode controller;
    selecting the first secure alternate mode from the list of available secure alternate modes; and
    authenticating the device using the secure mode controller.

10. A multi-mode interface apparatus, comprising:
    an alternate mode controller to receive, during a first alternate mode negotiation session, notice of availability of a first secure alternate mode; and
    a secure mode controller to, in response to selection of the first secure alternate mode, perform an authentication of a device using the first secure alternate mode,
    the alternate mode controller to:
        in response to authentication of the device, receive, during a second alternate mode negotiation session, notice of an availability of a second secure alternate mode and a first non-secure alternate mode from the device, the availability of the first non-secure alternate mode based on the authentication of the device; and
        in response to a failure to authenticate the device, receive notice of an availability of a second non-secure alternate mode, the second non-secure alternate mode different than the first non-secure alternate mode, an availability of the second non-secure alternate mode independent of the authentication of the device,
    the alternate mode controller and the secure mode controller implemented by hardware.

11. The multi-mode interface apparatus of claim 10, wherein the notice of the availability of the first secure alternate mode includes receiving a list of available modes, and wherein the second secure alternate mode is not included in the list of available modes.

12. The multi-mode interface apparatus of claim 10, wherein (a) the first alternate mode negotiation session includes the second alternate mode negotiation session, or (b) the second alternate mode negotiation session is initiated after a restart of the first alternate mode negotiation session.

13. A non-transitory computer-readable storage medium comprising instructions that, when executed, cause a machine to perform at least the operations of:
    performing an authentication of a first alternate mode device to a second alternate mode device using a first secure alternate mode published by the first alternate mode device;
    establishing, in response to successful authentication of the first alternate mode device to the second alternate mode device, a second secure alternate mode between the first alternate mode device and the second alternate mode device, the second secure alternate mode and a first non-secure alternate mode published by at least one of the first alternate mode device or the second alternate mode device in response to the successful authentication of the first alternate mode device to the second alternate mode device, an availability of the first non-secure alternate mode based on the authentication of the first alternate mode device; and
    in response to an unsuccessful authentication of the first alternate mode device to the second alternate mode device, establishing a second non-secure alternate mode between the first alternate mode device and the second alternate mode device, the second non-secure alternate mode different than the first non-secure alternate mode, an availability of the second non-secure alternate mode independent of the authentication of the first alternate mode device.

14. The multi-mode interface apparatus of claim 10, wherein the first non-secure alternate mode includes one or more of keyboard access, mouse access, a video interface, or a printer interface.

15. The non-transitory computer-readable storage medium of claim 13, wherein the instructions, when executed, cause the machine to perform the operations of:
    identifying the first secure alternate mode from a first published list of supported alternate modes; and identifying the second secure alternate mode from a second published list of supported alternate modes, wherein the second secure alternate mode is not included in the first published list of supported alternate modes.

16. The non-transitory computer-readable storage medium of claim 13, wherein the first non-secure alternate mode includes one or more of keyboard access, mouse access, a video interface, or a printer interface.

* * * * *